United States Patent [19]

Sitabkhan

[11] 4,422,676
[45] Dec. 27, 1983

[54] MULTI-PASSAGE ROTOR COUPLING

[75] Inventor: Mansur Sitabkhan, North Royalton, Ohio

[73] Assignee: Eaton Corporation, Cleveland, Ohio

[21] Appl. No.: 209,241

[22] Filed: Nov. 21, 1980

[51] Int. Cl.$^3$ ............................................. F16L 39/04
[52] U.S. Cl. ..................................... 285/136; 285/190
[58] Field of Search .............................. 285/136, 190

[56] References Cited

U.S. PATENT DOCUMENTS

| | | | |
|---|---|---|---|
| 2,343,491 | 3/1944 | Bard et al. | 285/136 |
| 2,458,343 | 1/1949 | Carleton | 285/136 |
| 2,577,858 | 12/1951 | Sampson | 285/136 X |
| 2,590,787 | 3/1952 | Nickles | 285/136 X |
| 2,877,026 | 3/1959 | Payne et al. | 285/136 X |
| 3,024,030 | 3/1962 | Koch | 285/190 X |

FOREIGN PATENT DOCUMENTS

| | | | |
|---|---|---|---|
| 602739 | 4/1978 | U.S.S.R. | 285/136 |

OTHER PUBLICATIONS

Deublins Catalog re Model 1895, Rotating Union, Catalog Information re Metal-Backed Seal Assemblies.

*Primary Examiner*—Thomas F. Callaghan
*Attorney, Agent, or Firm*—C. H. Grace; C. J. Toddy

[57] ABSTRACT

A triple passage rotor valve (10) includes a body (12) having an internal cylindrical bore (32) defined by a substantially linear internal surface, a substantially cylindrical rotor member (14) having a substantially linear outer surface (34) located within the cylindrical bore of the body member and rotatable relative to the body, first (16), second (18) and third (20) passageways disposed in the body, fourth (22), fifth (24) and sixth (26) passageways disposed in the rotor, seventh (28) and eighth (30) annular passageways for interconnecting the first and fourth passageways and second and fifth passageways, respectively, and seal means (70, 72, 74) disposed between the linear internal surface of the cylindrical bore and the outer surface of the rotor member for in part defining the seventh and eighth annular passageways and preventing the flow of fluid therebetween. The seal means includes first (70), second (72) and third (74) seal assemblies. First (76) and second (78) anti-rotation washer assemblies each of which is disposed between the linear internal surface of the cylindrical bore and the linear outer surface of the rotor member are provided for engaging with the first and second and second and third seal assemblies, respectively, to locate the first, second and third seal assemblies between the linear internal surface of the bore and the linear outer surface of the rotor member. A radially disposed fastening means (80) is provided for securing the first and second anti-rotation washers to the body.

7 Claims, 5 Drawing Figures

MULTI-PASSAGE ROTOR COUPLING

BACKGROUND OF THE DISCLOSURE

1. Field of the Invention

The present invention relates to a multi-passage rotor coupling and more particularly to a multi-passage rotor coupling having relatively rotatable members which include substantially linear surfaces and which is relatively economical to manufacture and easy to assemble.

Multi-passage rotor coupling are well known in the art and generally include a body having a cylindrical bore and a cylindrical rotor member which is located within the cylindrical bore of the body and rotatable relative thereto. Both the body and the rotor member have a plurality of passages therein and sealing means are provided for sealing the various passageways as they pass from the body to the rotor member. Many of the sealing means in the prior art require complicated structures which are difficult to assemble between the body and the rotor member. Such constructions increase the cost and complexity of the known multi-passage rotor coupling.

2. Prior Art

The Payne U.S. Pat. No. 2,877,026 discloses a typical prior art construction of a multi-passage rotor coupling wherein both the body of the coupling member and the rotor member have discontinuous surfaces thereon for locating the various seals in the device. Nickles, U.S. Pat. No. 2,590,787, Carleton, U.S. Pat. No. 2,458,343, and Bard, U.S. Pat. No. 2,343,491 all disclose various plural passage rotor coupling wherein substantially linear surfaces are disposed between the bore and body member. However, such constructions lead to relatively complicated seal assemblies which are difficult and costly to assemble.

SUMMARY OF THE INVENTION

Accordingly, it is a provision of the present invention to provide a triple passage rotor coupling including a body having an internal cylindrical bore defined by a substantially linear internal surface, a cylindrical rotor member having a substantially linear outer surface which is located within the cylindrical bore of the body and rotatable relative to the body about an axis of rotation, first, second and third passageways located in the body, fourth, fifth and sixth passageways located in the rotor and seventh and eighth annular passageways respectively interconnecting the first and fourth passageways and the second and fifth passageways to provide for fluid communication through the first, seventh and fourth passageways and the second, eighth and fifth passageways. Seal means is disposed between the bore and the rotor member for in part defining the seventh and eighth annular passageways and preventing the flow of fluid therebetween. The seal means includes first, second and third seal assemblies with the first and second seal assemblies cooperating to in part define the seventh annular passageway and the second and third seal assemblies cooperating to in part define the eighth annular passageway. First and second anti-rotation washers are provided for engaging the first and second and second and third seal assemblies, respectively, to locate the seal assemblies between the linear internal surface of the cylindrical bore and the substantially linear outer surface of the rotor member and a radially disposed fastening means is provided for securing the anti-rotation washers to the body.

Another provision of the present invention is to provide a new and improved triple passage rotor coupling as set forth in the preceding paragraph wherein each of the seal assemblies include an annular face seal connected to one of the anti-rotation washers and an annular wear ring connected to the rotor member for rotation therewith relative to the body. The face seal is fixed to the body by the anti-rotation washer. Each of the face seals and wear rings includes a sealing face thereon which is disposed substantially perpendicular to the axis of rotation.

Still another provision of the present invention is to provide a new and improved multi-passage rotor coupling including a body having an internal cylindrical bore defined by a substantially linear internal surface, a substantially cylindrical rotor member located within the bore and rotatable relative to the body about an axis of rotation, first and second passageways disposed in the body, third and fourth passageways disposed in the rotor and rotatable therewith, fifth and sixth annular passageways interconnecting the first and third passageways and the second and fourth passageways, respectively, to provide for the sequential flow of fluid through the first, fifth and third passageways and the second, sixth and fourth passageways, and seal means located between the linear internal surface of the bore and the linear outer surface of the rotor member for in part defining the fifth and sixth annular passageways and preventing the flow of fluid therebetween. The seal means includes at least first and second seal assemblies cooperating to in part define the fifth and sixth annular passageways and anti-rotation washer means is disposed between the linear internal surface of the bore and the linear outer surface of the rotor member for engaging with the first and second seal assemblies to locate the first and second seal assemblies between the body and the rotor member. Radially disposed fastening means is provided for securing the anti-rotation washer means to the body.

DESCRIPTION OF THE PREFERRED EMBODIMENT

Figure 1:
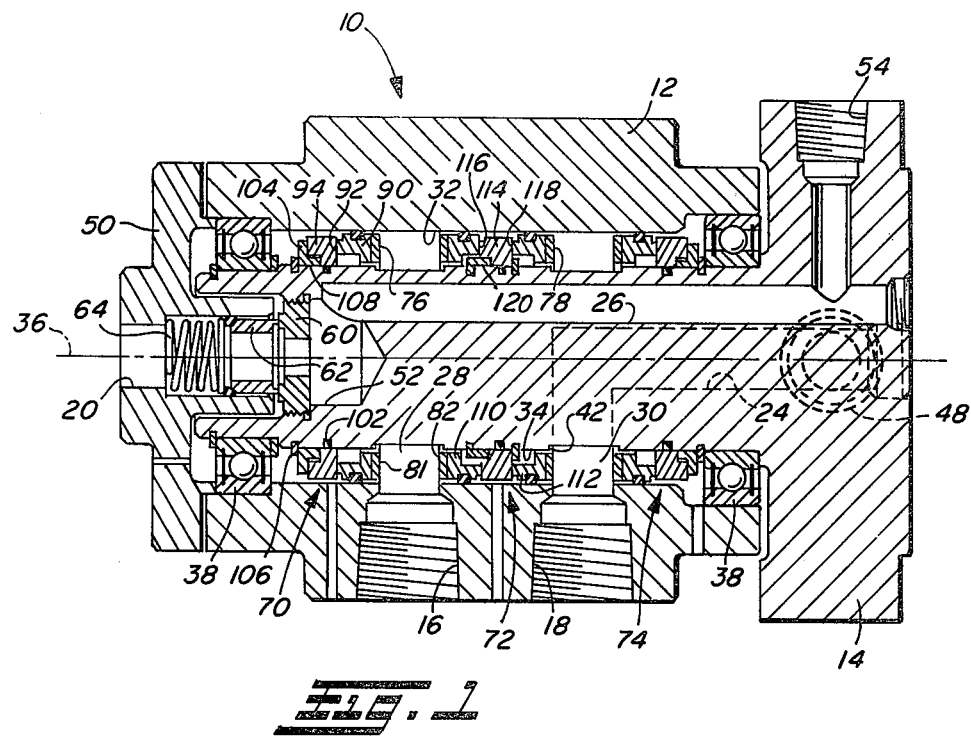
FIG. 1 is an axial section of the triple passage rotor coupling of the present invention taken approximately along the lines 1—1 of FIG. 3.
Figure 2:
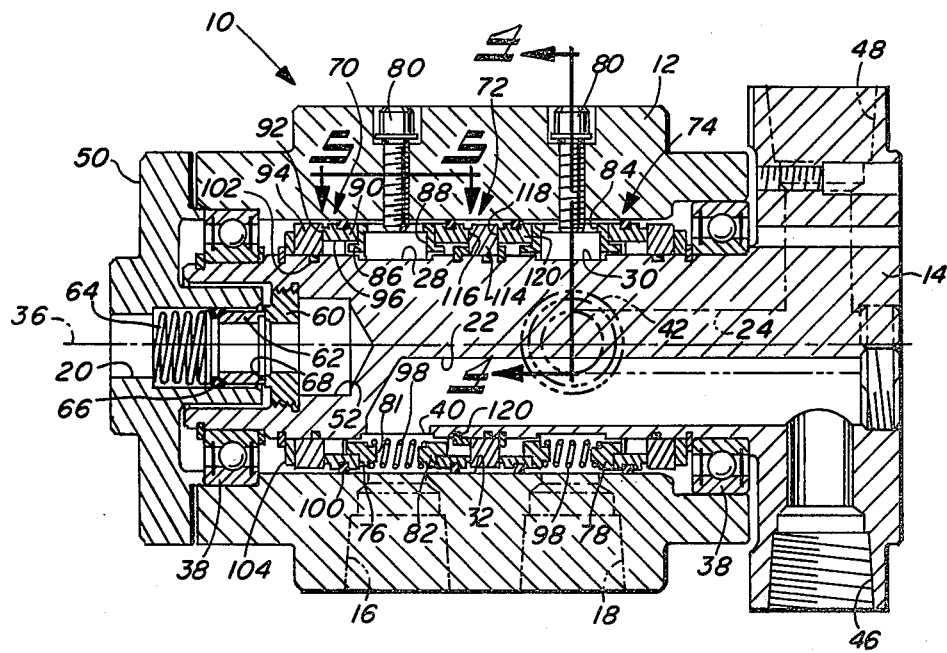
FIG. 2 is an axial section of the triple passage rotor coupling of the present invention taken approximately along the lines 2—2 of FIG. 3.
Figure 3:
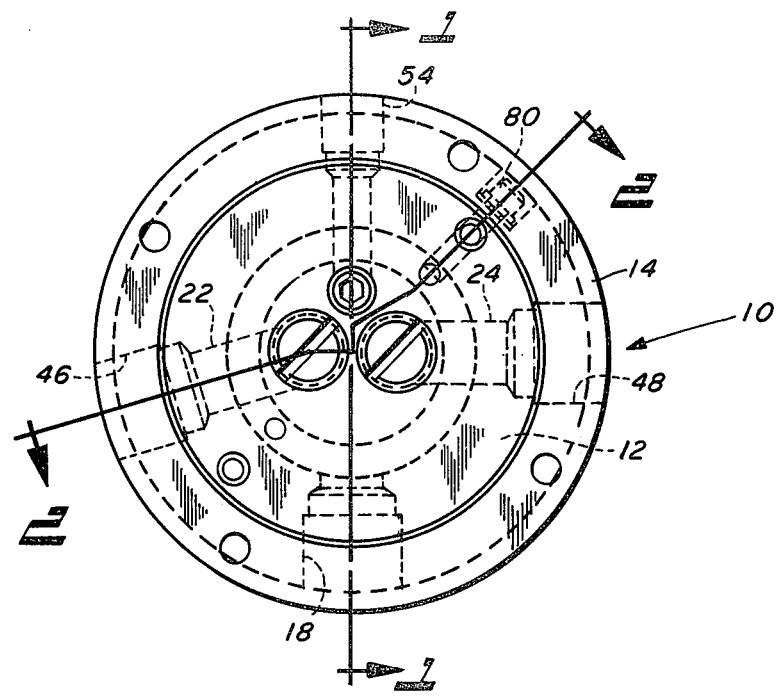
FIG. 3 is an end view of the triple passage rotor coupling of the present invention.

Referring to the drawings, and more particularly to FIGS. 1 and 2, a multi-passage rotor coupling 10 is disclosed. The multi passage rotor coupling 10 is illustrated as a triple passage rotor coupling 10 but could include two or more passageways therein without departing from the scope of the present invention. The triple passage rotor coupling 10 includes a body member 12 and a rotor member 14 which is rotatable relative to the body member 12 about an axis of rotation 36. The body member 12 includes an axially extending cylindrical bore defined by the substantially linear cylindrical surface 32. The rotor member 14 includes a substantially linear cylindrical outer surface 34 which is adapted to be received in the cylindrical bore 32. A plurality of bearing means 38 are disposed between the cylindrical bore 32 and the outer surface 34 of the rotor member 14 to provide for relative rotation between the body member 12 and rotor member 14.

The body member 12 includes first, second and third passageways 16, 18 and 20, respectively, therein and the rotor member 14 includes fourth, fifth and sixth passageways, 22, 24 and 26, respectively. Seventh and eighth annular passageways 28 and 30, respectively, are disposed between the cylindrical bore 32 in the body 12 and the cylindrical external surface 34 of the rotor member 14. The passageway 28 interconnects the passageway 16 disposed in the body member 12 and the passageway 22 disposed in the rotor member 14 to provide for the sequential flow of fluid through the passageway 16, through the annular passageway 28 and through the passageway 22. The annular passageway 30 interconnects the passageway 18 located in the body member 12 and the passageway 24 located in the rotor member 14 to provide for the sequential flow of fluid through the passageway 18, around the annular passageway 30 and through the passageway 24.

The passageway 22 includes an opening 40 therein disposed on the cylindrical surface 34 of the rotor member 14 and an outlet 46 located on the rotor member 14. The passageway 24 includes an inlet 42 disposed on the cylindrical surface 34 of the rotor member 14 and an outlet 48. The rotor member 14 is rotatable relative to the body member 12 and the inlets 40, 42 for the passageways 22, 24, respectively, rotate with the rotor member 14 relative to the body 12. The annular passageways 28 and 30 extend around the cylindrical surface 34 of the rotor member 14 to provide continuous fluid communication between the passageways 22 and 16 and 24 and 18, irrespective of the position of the rotor member 14 relative to the body 12.

The passageway 20 is axially disposed within an end piece 50 of the body 12 and communicates with the axial passageway 26 via the inlet 52 thereof. The inlet 52 to the passageway 26 is disposed on the axis of rotation 36 of the rotor member 14 to enable the inlet 52 to constantly be aligned with the passageway 20 irrespective of the position of the rotor member 14. An outlet 54 is provided for directing the flow of fluid from the passageway 26. While the above noted passageways have been described as having specific inlets and outlets, it should be appreciated that the direction of fluid flow therethrough is not critical to the present invention and the inlets and the outlets to the fluid passageways could be interchanged without departing from the scope of the present invention.

The orifice 52 for the passageway 26 is in part defined by an annular ring 60 which is threaded into the rotor member 14 about the axis of rotation 36. The annular ring 60 is adapted to mate with a face seal 62 located within the passageway 20 in the body member 12. The face seal 62 is biased by a spring member 64 to provide continuous engagement between the face seal 62 and the annular member 60 upon rotation of the rotor member 14 relative to the body 12. An annular O-ring 66 is disposed between the spring member 64 and the face seal 62 to provide for seating of the spring member 64 relative to the face seal 62. The annular member 60 preferably includes a lapped surface portion 68 thereon which engages with the face seal 62 to provide a sealing relationship between the passageways 20 and 26. Utilization of the annular member 60 eliminates the need to provide a lapped sealing surface integral with the member 14 and allows the lapping of the member 60 to be performed without involving machining of the rotor member 14. Such a construction reduces manufacturing costs and allows for ease of assembly.

First, second and third seal assemblies 70, 72 and 74, respectively, are disposed between the internal bore 32 and the external surface 34 of the rotor member 14 to in part define the annular passageways 28 and 30 and to prevent fluid flow between the passageways 28, 30. Anti-rotation washer assemblies 76 and 78 are disposed between the seal assemblies 70, 72 and 72, 74, respectively, and between the internal surface 32 of the body 12 and the external surface 34 of the rotor 14. The anti-rotation washer assemblies 76 and 78 in part define the annular passageways 28 and 30, respectively, and locate the seal assemblies 70, 72 and 74 within the body of the rotor coupling assembly.

Figure 4:
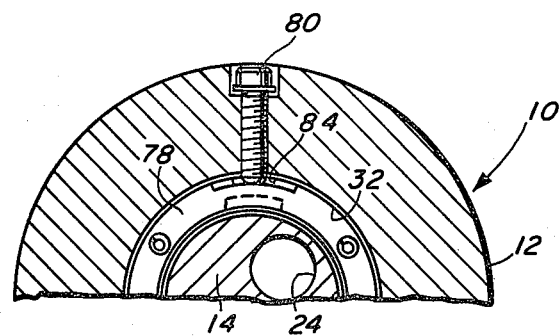
FIG. 4 is a fragmentary sectional view taken approximately along the lines 4—4 of FIG. 2, more fully illustrating the bolt member for locating the anti-rotation washer assembly.
Figure 5:
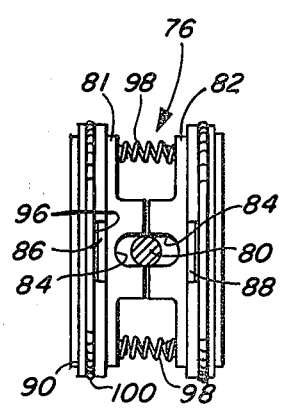
FIG. 5 is a fragmentary sectional view taken approximately along the lines 5—5 of FIG. 2, more fully illustrating the anti-rotation washer assembly.

The anti-rotation washer assemblies 76 and 78, more fully illustrated in FIGS. 4 and 5, are fixed relative to the body member 12 by radially extending fastener means, which in the preferred embodiment comprises bolt members 80. The anti-rotation washer assemblies 76 and 78 are substantially identical and a description of the washer assembly 76 will be understood by referring to FIG. 5. The anti-rotation washer assembly 76 includes a pair of annular washers 81, 82. The washers 81, 82 are disposed adjacent to each other and each includes a substantially U-shaped channel 84 disposed therein. The channels 84 define an opening which is adapted to receive the radially extending bolt member 80 therein. The tolerances between the channel openings 84 and the bolt 80 in a direction substantially parallel to the axis of rotation 36 are relatively loose to allow shifting of the anti-rotation washer assemblies in an axial direction relative to the housing 12 and bolt 80 and the tolerances between the channels 84 and the bolt 80 in a tangential direction about the circumference of the washer members 81, 82 is relatively tight to prevent rotation of the washers 81, 82 relative to the bolt member 80. It should be appreciated that once the bolt member 80 is inserted into the opening defined by the channels 84, the anti-rotation washer assembly will be secured by the bolt member 80 to the body 12 to prevent relative rotation of the anti-rotation washer assembly and the body 12. Suitable surface projections such as the tangs 86, 88 are located on the washer members 81, 82, respectively, and extend therefrom in a direction substantially parallel to the axis of rotation 36. The tangs 86, 88 cooperate with the seal assemblies to prevent rotation of a portion of the seal assemblies relative to the body 12 as will be described more fully hereinbelow.

Each of the seal assemblies 70, 72 and 74 include a face seal and a wear ring. The seal assemblies 70 and 74 are substantially identical and only one of these seal assemblies will be described with like numbers referencing like portions on the other seal assembly.

The seal assembly 70 includes a face seal 90 having a sealing face 92 disposed thereon substantially perpendicular to the axis of rotation 36 and a wear ring 94. The wear ring 94 is adapted to engage with the sealing face 92 of the face seal 90 to establish a sealing relationship therebetween. The wear ring 94 is operable to rotate relative to the face seal 90 as will be described more fully hereinbelow.

The face seal 90 includes an indentation 96 which is adapted to engage with the projection 86 disposed on the anti-rotation washer 81. The indentation 96 cooperates with the projection 86 to prevent relative rotation of the anti-rotation washer 81 and the face seal member 90. Suitable spring means 98 is disposed between the anti-rotation washers 81 and 82 to bias the anti-rotation washers in an axial direction to insure engagement of the anti-rotation washers and projections thereon with the matching indentations on the face seals. A suitable O-ring 100 is disposed in a channel in the annular face seal 90 to provide a sealing engagement between the face seal 90 and the cylindrical wall 32 of the body member 12. An O-ring 102 is disposed in a channel on the external cylindrical surface 34 of the rotor member 14 and engages with the wear ring 94 to provide a sealing engagement between the wear ring 94 and the external surface 34 of the rotor 14. A flanged anti-rotation collar 104 is disposed adjacent the wear ring 94 and includes a projection 108 thereon which mates with a corresponding indentation on the wear ring 94 to prevent rotation of the wear ring 94 relative to the anti-rotation collar 104. A snap ring 106 is disposed about the outer surface 34 of the rotor 14 to hold the anti-rotation collar 104 in place relative to the rotor member 14. The anti-rotation collar 104 includes an axial projection thereon, not illustrated, which engages with an axially disposed indentation on the snap ring 106 to prevent rotation of the collar 104 relative to the snap ring 106 and rotor member 14. Thus, it should be appreciated that the wear ring 94 rotates with the rotor member 14 and the face seal 90 is fixed to the body 12. Therefore, relative rotation occurs between the face seal 90 and the wear ring 94 upon rotation of the rotor 14 relative to the body 12.

The seal assembly 72 is similar to the seal assemblies 70 and 74, but includes two face seal members 110 and 112 which engage on opposite sides of a wear ring 114. The face seal member 110 includes a sealing face 116 which engages with the wear ring 114 and the face seal member 112 includes a sealing face 118 which engages with the opposite side of the wear ring 114. Each of the sealing faces 116 and 118 of the face seals 110 and 112, respectively, are disposed substantially perpendicular to the axis of rotation 36 and establish a sealing relationship between the face seals 110 and 112 and the wear ring 114. The wear ring is fixed for rotation with the rotor member 14 by a snap ring and an anti-rotation collar 120, which cooperates with the wear ring 114 to fix the wear ring relative to the rotor member 14 in a manner analagous to the manner in which the snap ring 106 and anti-rotation collar 104 cooperate with the wear ring 94. Each of the face seals 110 and 112 include a suitable O-ring disposed about the circumference thereof which cooperates to provide a sealing relationship between the face seals 110 and 112 relative to the body 12. Additionally, each of the face seals 110, 112 include a suitable indentation thereon which cooperates with a projection disposed on the anti-rotation washer assemblies 76, 78 in an analogous manner to the cooperation between the projection 86 on the anti-rotation washer 81 and the indentation 96 disposed on the face seal 90. Thus, it should be apparent that the face seal members 110 and 112 are fixed to the body 12 while the annular wear ring 114 is fixed to the rotor member 14 for rotation therewith relative to the body 12 and the face seals 110, 112. The spring means 98 in each of the anti-rotation washer assemblies 76, 78 provide an axial force which biases the face seal 110 toward the right as viewed in FIG. 1 and biases the face seal 112 to the left as viewed in FIG. 1 to effect a cooperative sealing relationship between the face seals 110 and 112 and the wear ring 114.

The utilization of face seals having sealing surfaces which are disposed perpendicular to the axis of rotation rather than seals utilizing sealing surfaces disposed parallel to the axis of rotation allows for a simpler construction of the seals in the rotor valve and effects a decrease in diameter of the sealing surface due to the fact that the sealing surface is not on the external annular outer surface of the face seal member. By decreasing the diameter at the sealing surface, the relative speed of rotation between the face seals and the wear ring is decreased and a lower rate of wear between the face seal and the wear ring is accomplished. Additionally, the use of a linear bore 32 decreases the cost of manufacture of the body member 12 and the use of a substantially linear cylindrical outer surface on the rotor member 14 decreases the cost of manufacture thereof. It should be apparent that the linear outer surface of the rotor 14 includes a number of annular grooves thereon which receive such things as the snap rings, O-rings and anti-rotation collars. However, the surfaces on which the seal assemblies rest take a substantially linear configuration. This eliminates the need for extra machining of the rotor member 14 to accommodate various seal structures.

It should also be appreciated that the construction of the present triple passage rotor coupling provides for an ease of assembly of the rotor coupling. The seal assemblies can be located within the annular chamber defined between the internal surface 32 of the body 12 and the external surface 34 of the rotor 14 and then located in place by the use of the radial fastening means 80. This provides a much more compact and easily assemblable seal structure than known in the prior art. While the preferred embodiment of the invention has been disclosed as providing a triple passage rotor coupling, it should be apparent that two or more passages could be utilized in the rotor coupling without departing from the scope of the present invention.

From the foregoing, it should be apparent that a new and improved multi-passage rotor coupling has been provided. The coupling includes a body having an internal cylindrical bore therein defined by a substantially linear internal surface and a substantially cylindrical rotor member having a substantially linear outer surface is located within the bore of the body member and rotatable about an axis of rotation relative to the body. First and second passageways are located in the body, third and fourth passageways are located in the rotor, and fifth and sixth annular passageways are provided for interconnecting the first and third passageway and the second and fourth passageway to provide for the sequential flow of fluid through the first, fifth and third passageways and the second, sixth and fourth passageways. The fifth and sixth annular passageways are in part defined by the linear internal surface of the cylindrical bore and the linear outer surface of the rotor member. Seal means are provided for in part defining the fifth and sixth annular passageways and preventing the flow of fluid therebetween. The seal means include at least first and second seal assemblies and an anti-rotation washer means is disposed between the internal surface of the cylindrical bore and the outer surface of the rotor member for engaging with the seal assemblies to locate the seal assemblies between the linear internal surface of the cylindrical bore and the linear outer surface of the rotor member. Radially disposed fastening means are provided for securing the anti-rotation washer means to the body.

I claim:

1. A multi-passage rotary coupling comprising a body having an internal cylindrical bore therein, a rotor member having a substantially cylindrical portion located within said cylindrical bore and rotatable relative to said body about an axis of rotation, bearing means interposed between said rotor member and said body located at each end of said bore for supporting said rotor member within said cylindrical bore for rotation relative thereto, three annual wear rings interposed between said bearing means and secured to said cylindrical portion of the rotor member for rotation therewith, one wear ring located adjacent each bearing and a third wear ring spaced axially between said bearings, each wear ring having a sealing face thereon disposed substantially perpendicular to said axis of rotation, a pair of anit-rotation member assemblies, one assembly located between each end wear ring and said central wear ring, said anti-rotation member assemblies each having a pair of axially spaced annular face sealing members, each of said sealing members having a face seal disposed substantially perpendicular to said axis of rotation, one face seal of each sealing member engaging a sealing face of said wear rings, an annular seal on each sealing member engaging the internal surface of said bore, means for preventing said assemblies from rotating relative to said body, said assemblies, wear rings and annular seals forming a pair of annular axially spaced passageways, openings through said body terminating with each annular passageway and, openings through said rotor terminating with each annular passageway thereby forming two fluid passages between the openings in said body and rotor.

2. A multi-passage rotary coupling as claimed in claim 1 in which said means for preventing said assemblies from rotating relative to said body includes radially disposed fastening means extending through said body and into an opening in each of said assemblies permitting limited axial movement of said assemblies.

3. A multi-passage rotary coupling as claimed in claim 1 in which the annular sealing faces of each anti-rotation assembly is movable axially of said assembly and includes spring means extending between the pair of axially spaced annular face sealing members of each of said anti-rotation washer means for biasing said face seals against the sealing faces of said wear rings.

4. A multi-passage rotary coupling as claimed in claim 3, in which said spring means extends axially across each annular passageway.

5. A multi-passage rotary coupling as claimed in claim 1 in which said third wear ring has a pair of annular sealing faces, each of which is engaged by one face seal of each anti-rotation assembly.

6. A multi-passage rotary coupling as defined in claim 1 wherein each of said anti-rotation washer assemblies includes a pair of anti-rotation washers having a surface projection on each washer and each of said annular face sealing members includes a matching surface indentation, each of said surface projections being disposed within one of said surface indentations to prevent rotation of each of said face sealing members relative to said anti-rotation washer assemblies.

7. A multi-passage rotary coupling as defined in claim 6 wherein said for preventing said assemblies from rotating relative to said body means includes a bolt member radially disposed through said body and received in a radial opening disposed between said anti-rotation washers to prevent rotation thereof.

* * * * *